United States Patent [19]

Kim

[11] Patent Number: 6,016,296
[45] Date of Patent: *Jan. 18, 2000

[54] METHOD FOR ADJUSTING REPRODUCTION SPEED OF CD-ROM DRIVE AND DEVICE SUITABLE THEREFOR

[75] Inventor: Hong-jang Kim, Suwon, Rep. of Korea

[73] Assignee: Samsung Electronics Co., Ltd, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/892,958

[22] Filed: Jul. 16, 1997

[30] Foreign Application Priority Data

Jul. 25, 1996 [KR] Rep. of Korea ........................ 96-30460

[51] Int. Cl.[7] ....................................................... G11B 7/00
[52] U.S. Cl. ................................................ 369/50; 369/54
[58] Field of Search ................................... 369/50, 47, 54, 369/58, 48

[56] References Cited

U.S. PATENT DOCUMENTS 5,051,976  9/1991  Kawano et al. .......................... 369/50
5,642,342  6/1997  Murata ..................................... 369/50

*Primary Examiner*—Thang V. Tran
*Attorney, Agent, or Firm*—Dilworth & Barrese

[57] ABSTRACT

A device and method for adjusting the reproduction speed of a CD-ROM drive according to variations of a supply voltage. The supply voltage is compared with a predetermined reference voltage. If the supply voltage is lower than the reference voltage, the rotating speed of the spindle motor is lowered to a corresponding speed. Therefore, the error correcting capability of the DSP is maintained and the reliability of a product increases.

9 Claims, 3 Drawing Sheets

METHOD FOR ADJUSTING REPRODUCTION SPEED OF CD-ROM DRIVE AND DEVICE SUITABLE THEREFOR

BACKGROUND OF THE INVENTION

1. Field of the Invention

The present invention relates to a CD-ROM drive, and more particularly, to a method for adjusting the reproduction speed of a CD-ROM drive according to variations of a supply voltage, and a device suitable for the method.

2. Description of the Related Arts

In a CD-ROM drive in a computer system, data cannot be read out properly if a supply voltage supplied varies significantly, especially when the supply voltage drops below a reference voltage, for example, in a notebook computer which uses only a battery. Thus, a system error may occur, which should be prevented by adjusting the speed of the CD-ROM drive.

FIG. 1 is a block diagram of a conventional CD-ROM drive.

In FIG. 1, a servo 120 controls the speed of a spindle motor 110. The spindle motor 110 rotates the turntable 100 on which a CD-ROM is placed. A preamplifier 130 amplifies signal read out from the disk by use of an optical pickup (not shown) to a predetermined level. An interface 140 transmits and receives data to and from a host computer (not shown). A digital signal processor (DSP) 150 controls the servo 120, analog-to-digital converts the amplified signal output by the preamplifier 130, and demodulates and error-correction-decodes such data. When the servo 120 is locked, the DSP 150 outputs the error-corrected data to the interface 140. A microcontroller 160 determines whether the servo 120 is normally controlled by the DSP 150 so that the servo 120 is normally operated.

Here, if the servo 120 is not normally operated, the microcontroller 150 retries several times such that the servo 120 is normally controlled. If the servo 120 is not normally operated despite the retrials, the microcontroller 160 stops the CD-ROM drive and sends an error signal to the host computer via the interface 140.

In the conventional CD-ROM drive, in case that a supply voltage drops, the error correcting capability of the DSP is reduced, and the torque of the spindle motor is lowered so that an intended rotating speed cannot be achieved. As a result, the DSP 130 cannot normally correct an error in the data and the servo 120 cannot be unlocked. Therefore, the system cannot operate properly. Such a problem becomes serious especially when a system is driven with only a battery without another power source, e.g., in a multimedia notebook computer.

SUMMARY OF THE INVENTION

An object of the present invention is to provide a method for adjusting the speed of a CD-ROM drive according to variations of a supply voltage so that the error correcting capability of a digital signal processor is maintained by adjusting the speed of a spindle motor when a voltage supplied to the CD-ROM drive is dropped.

Another object of the present invention is to provide a device suitable for the above method.

To achieve one of the objects above, there is provided a method for adjusting the reproduction speed of a CD-ROM drive according to variations of a supply voltage, the method comprising the steps of: (a) comparing the supply voltage with a predetermined reference voltage; and (b) lowering the rotating speed of the spindle motor to a corresponding speed when the supply voltage is lower than the reference voltage in the step (a).

To achieve another one of the objects above, there is provided a device for adjusting the reproduction speed of a CD-ROM drive according to variations of a supply voltage, comprising: a spindle motor for rotating a turntable on which a CD-ROM is placed; a servo for controlling the speed of the spindle motor; a digital signal processor for controlling the servo, correcting a predetermined error in data extracted from the CD-ROM, and outputting the corrected data if the servo is locked; comparing means for comparing a voltage supplied from system with a predetermined reference voltage; and a microcontroller for determining whether the digital signal processor normally controls the servo and the servo is normally operated, and outputting a signal for adjusting the rotating speed of the spindle motor to a corresponding speed on the basis of the output value of the voltage level comparing means.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
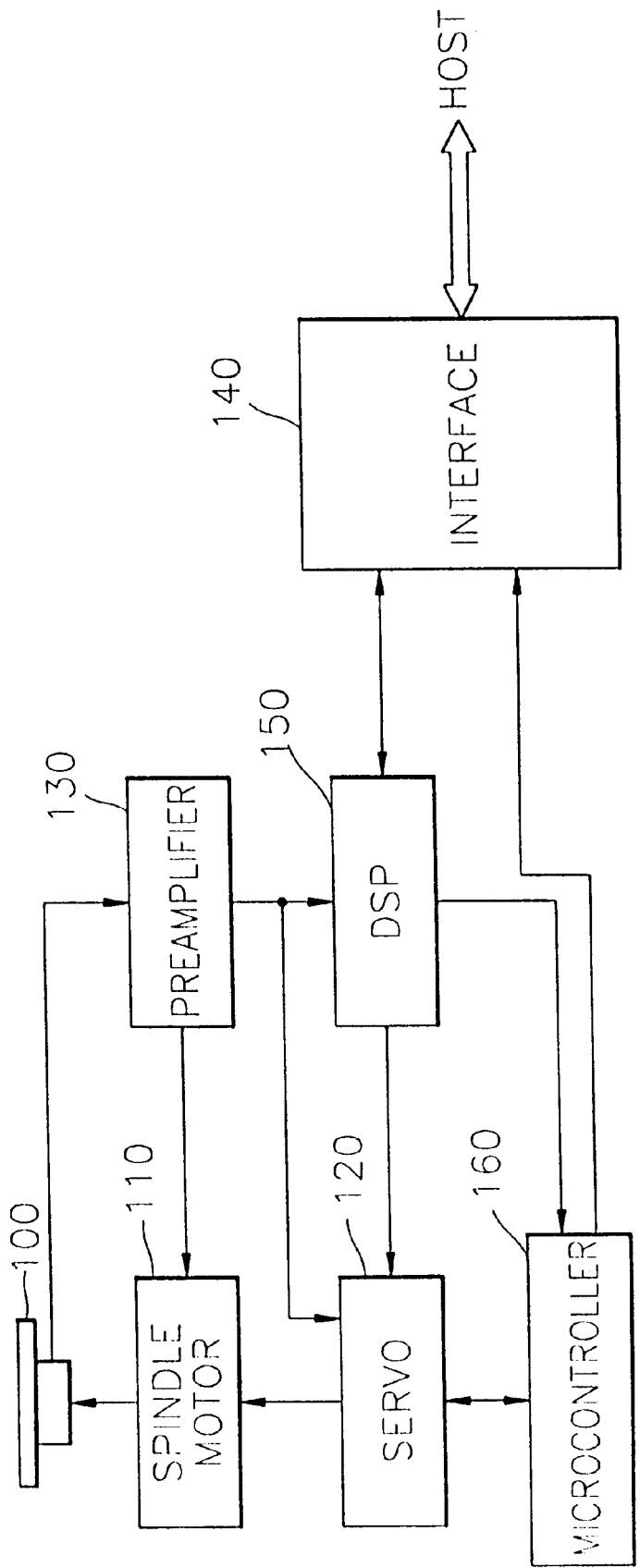
FIG. 1 is a block diagram of a conventional CD-ROM drive.
Figure 2:
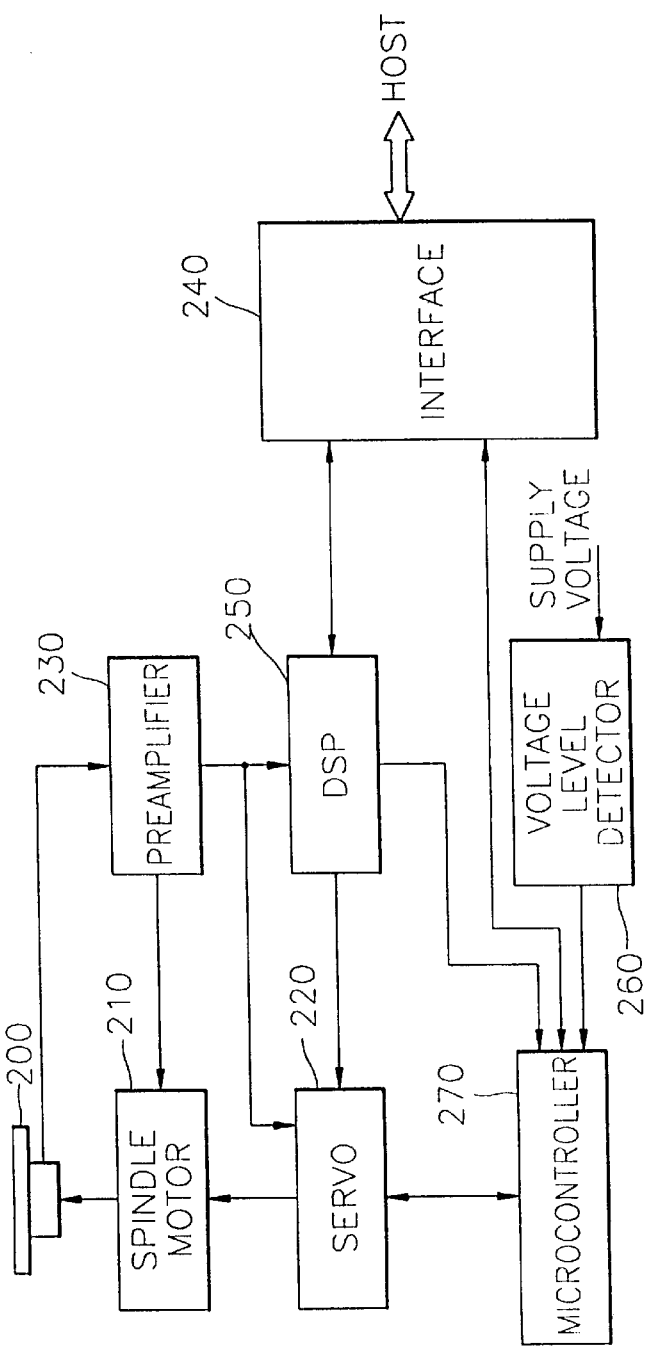
FIG. 2 is a block diagram of a CD-ROM drive according to the present invention.

In FIG. 2, a servo 220 controls the speed of a spindle motor 210. The spindle motor 210 rotates the turntable 200 on which a CD-ROM is placed. A preamplifier 230 amplifies signal read out from the disk by use of an optical pickup (not shown) to a predetermined level. An interface 240 transmits and receives data to and from a host computer (not shown).

A digital signal processor (DSP) 250 controls the servo 120, analog-to-digital converts the amplified signal output by the preamplifier 230, and demodulates and error-correction-decodes such data. When the servo 220 is locked, the DSP 250 outputs the error-corrected data to the interface 240.

A voltage level comparator 260 compares a supply voltage with predetermined reference voltages, and outputs a compared result to a microcontroller 270.

The microcontroller 270 determines whether the servo 120 is normally controlled by the DSP 150 so that the servo 120 is normally operated. Also, the microcontroller 270 generates a control signal on the basis of the compared result signal from the voltage level comparator 260 to output such signal to the servo 220.

Figure 3:
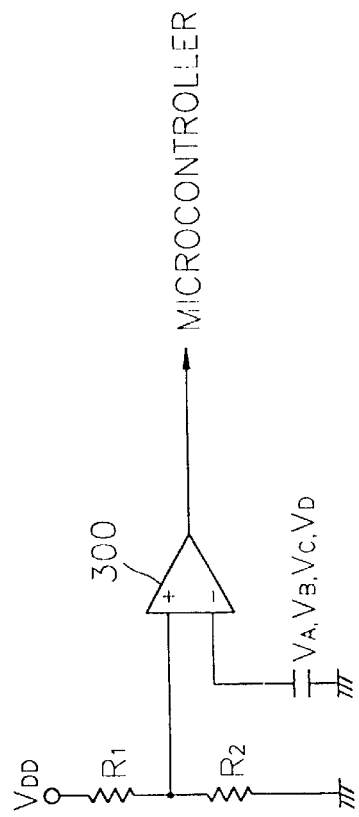
FIG. 3 is a circuit diagram of one of voltage detection circuits within the FIG. 2 voltage level detector.

FIG. 3 is a circuit diagram of one of voltage detection circuits within the FIG. 2 voltage level detector.

In FIG. 3, a comparator 300 compares an input voltage, which is the supply voltage $V_{DD}$ divided by resistors R1 and R2, with a predetermined voltage $V_A$, $V_B$, $V_C$ or $V_D$ to output the compared result to the microcontroller.

When a system voltage supplied to the CD-ROM drive drops, the voltage level comparator 260 compares the voltage supplied to the CD-ROM with a plurality of reference voltages and outputs the result. The microcontroller 270 receives the result and lowers the rotating speed of the spindle motor, thereby keeping the error correcting capability of the DSP 230. Then, the microcontroller 270 returns the rotating speed of the spindle motor to its original speed when the voltage is recovered.

Figure 4:
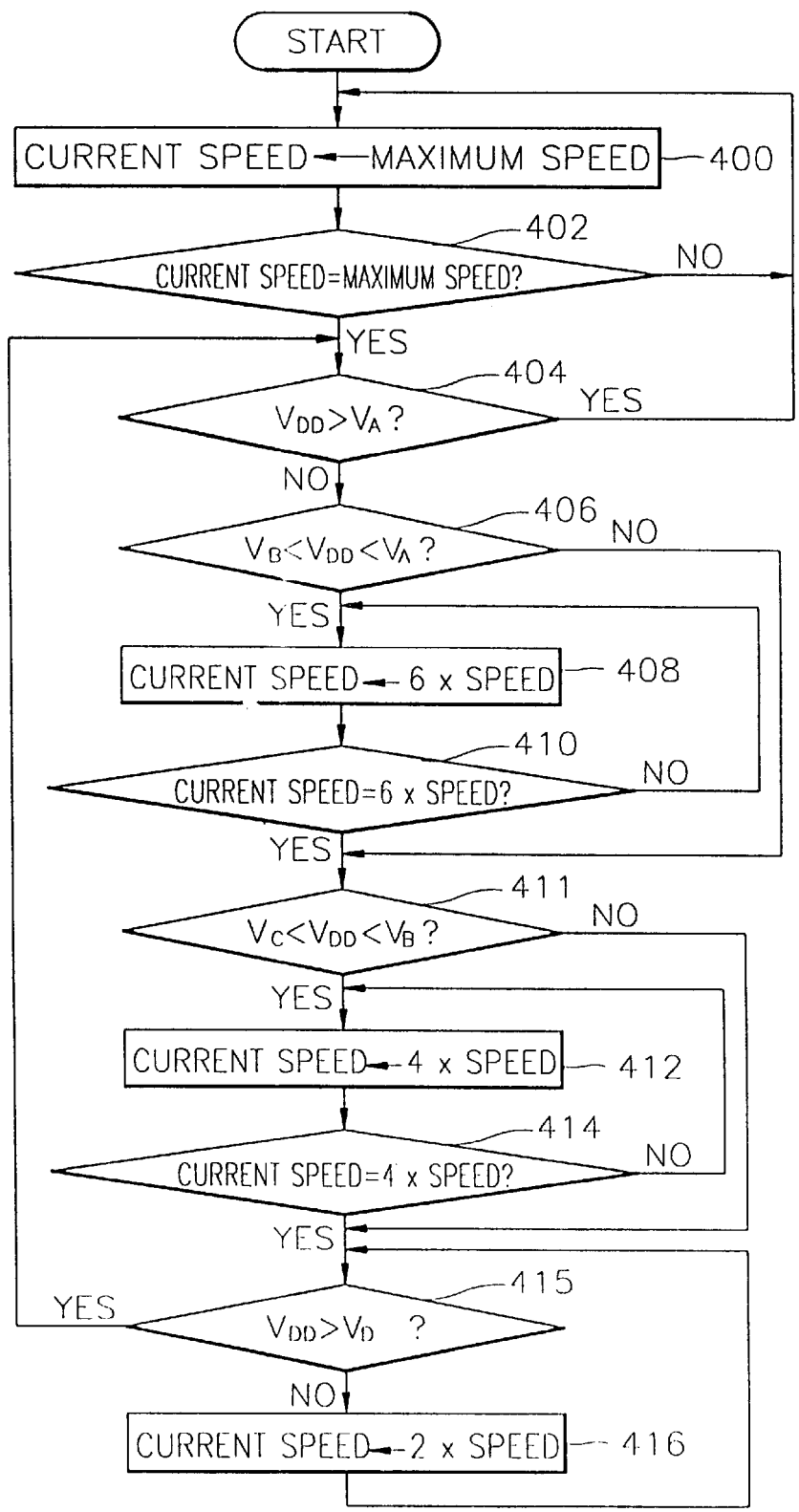
FIG. 4 is a flowchart illustrating an embodiment of a method for adjusting the speed of a CD-ROM drive according to the present invention.

FIG. 4 is a flowchart illustrating an embodiment of a method for adjusting the speed of a CD-ROM drive according to variations of supply voltage according to the present invention.

Referring to FIG. 4, an error correcting ability is maintained by comparing the supply voltage $V_{DD}$ with predetermined reference voltages $V_A$, $V_B$, $V_C$, $V_D$, ... sequentially and adjusting the speed of a spindle motor correspondingly. For example, in the present embodiment, it is assumed that the voltage supplied to the system is 5V, the predetermined reference voltages are 4.5, 4, 3, and 2, and maximum rotating speed of the spindle motor is 8×,. Then, the rotating speed of the spindle motor is lowered to 6×, 4×,, and 2× speed by comparing the supply voltage with the respective reference voltages sequentially.

First, the initial speed of the spindle motor is set to the maximum speed, i.e. 8×speed, in step 400. Here, the maximum speed is assumed to be.

In step 402, it is determined whether a current speed reaches the maximum speed. If the current speed is equal to the maximum speed, the supply voltage $V_{DD}$ is compared with a first reference voltage $V_A$ in step 404. If $V_{DD}$ is greater than $V_A$ in step 404, the spindle motor is operated at the maximum speed which was set in the step 400.

However, if the supply voltage $V_{DD}$ is less than the first reference voltage $V_A$ in the step 404, it is determined whether the supply voltage $V_{DD}$ is between the first and second reference voltages $V_A$ and $V_B$ in step 406.

If the supply voltage $V_{DD}$ is greater than $V_B$ but less than $V_A$, the current speed is lowered to 6×speed in step 408. In step 410, it is confirmed that the current speed of the spindle motor is 6×speed.

Meanwhile, in the case it is determined that the supply voltage $V_{DD}$ is less than the second reference voltage $V_B$ in the step 406, it is determined whether the supply voltage $V_{DD}$ is between the second and third reference voltages $V_B$ and $V_C$ in step 411.

If the supply voltage $V_{DD}$ is greater than $V_C$ but less than $V_B$, the current speed is lowered to 4×speed in step 412. In step 414, it is confirmed that the current speed of the spindle motor is 4×speed.

Thus, the rotating speed of the spindle motor is lowered by 2×speed if the supply voltage continues to drop.

In step 415, it is determined whether the supply voltage $V_{DD}$ is greater than a fourth reference voltage $V_D$. If the supply voltage $V_{DD}$ is greater than the fourth reference voltage $V_D$, the procedure goes back to the step 404. On the other hand, if the supply voltage $V_{DD}$ is not greater than the fourth reference voltage $V_D$, the speed of the spindle motor is maintained at 2×speed in step 416.

However, in alternative of the present embodiment, various modifications can be made to the present embodiment. For example, the rotating speed of the spindle motor may be lowered by 1×speed rather than 2×speed when the supply voltage drops. Also, if the supply voltage $V_{DD}$ is not greater than the fourth reference voltage $V_D$, the speed of the spindle motor may be maintained at 1×speed in step 416 or the system may be halted.

Thus, it is noted that the aspects of the embodiment described above are illustrative and that the scope of the invention should not be limited by the embodiment.

As described above, according to the method for adjusting the speed of a CD-ROM drive depending on the variation of a system according to the present invention, the error correcting capability of the DSP is maintained by comparing a supply voltage with predetermined reference voltages and adjusting the rotating speed of the spindle motor correspondingly. As a result, the reliability of the system increases.

What is claimed is:

1. A method for adjusting the reproduction speed of a CD-ROM drive assembly having a terminal for receiving a supply voltage, where the reproduction speed is adjusted according to variations of the supply voltage, said method comprising the steps of:

(a) comparing a voltage level representing a voltage generated from the supply voltage with a predetermined reference voltage level representing a stored voltage; and (b) lowering the rotating speed of a spindle motor of the CD-ROM assembly to a corresponding speed when the voltage level is lower than the predetermined reference voltage level in said step (a).

2. A method for adjusting the reproduction speed of a CD-ROM drive according to variations of a supply voltage as claimed in claim 1, further comprising the step of:

(c) returning the rotating speed of the spindle motor to an original rotating speed, when the supply voltage is recovered.

3. The method according to claim 1, further comprising the step of correcting an error determined from data extracted from said CD-ROM and outputting said estimated data if said spindle motor is stopped.

4. The method according to claim 1, wherein said steps (a) and (b) are repeated and said rotating speed is decreased by a predetermined value on each iteration.

5. A device for adjusting the reproduction speed of a CD-ROM drive assembly having a terminal for receiving a supply voltage, where the reproduction speed is adjusted according to variations of the supply voltage, said device comprising:

a spindle motor for rotating a turntable on which a CD-ROM is placed;

a servo for controlling the speed of said spindle motor;

a digital signal processor for controlling said servo, correcting a predetermined error in data extracted from said CD-ROM, and outputting said corrected data if said servo is locked;

voltage level comparing means for comparing a voltage level representing a voltage generated from the supply voltage with a predetermined reference voltage level representing a stored voltage and outputting an output value based on the voltage level comparison; and a microcontroller for determining whether said digital signal processor normally controls said servo and said servo is normally operated, and outputting a signal for adjusting the rotating speed of said spindle motor to a corresponding speed on the basis of the output value of said voltage level comparing means.

6. The device according to claim 5, wherein said microcontroller includes means for causing the rotating speed of said spindle motor to decrease by a predetermined value upon determination of the output value from said comparing means.

7. The method according to claim 4, wherein the predetermined value is equal to one quarter of a maximum speed and where the maximum speed defines a maximum rotating speed of the spindle motor.

8. The device according to claim 6, wherein the predetermined value is equal to one quarter of a maximum speed and where the maximum speed defines a maximum rotating speed of the spindle motor.

9. A device for adjusting the reproduction speed of a CD-ROM drive according to variations of a supply voltage, comprising:

a spindle motor for rotating a turntable on which a CD-ROM is placed;

a servo for controlling the speed of said spindle motor;

a digital signal processor for controlling said servo, correcting a predetermined error in data extracted from said CD-ROM, and outputting said corrected data if said servo is locked;

comparing means for comparing a voltage supplied to the CD-ROM drive with a predetermined reference voltage; and a microcontroller for determining whether said digital signal processor normally controls said servo and said servo is normally operated, and outputting a signal for adjusting the rotating speed of said spindle motor to a corresponding speed on the basis of the output value of said voltage level comparing means, said microcontroller including means for causing the rotating speed of said spindle motor to decrease by a predetermined value upon determination of the output value from said comparing means, wherein the predetermined value is equal to one quarter of a maximum rotating speed of the spindle motor.

* * * * *